United States Patent
Langford (10) Patent No.: US 11,934,384 B1
(45) Date of Patent: Mar. 19, 2024

(54) SYSTEMS AND METHODS FOR PROVIDING A NEAREST NEIGHBORS CLASSIFICATION PIPELINE WITH AUTOMATED DIMENSIONALITY REDUCTION

(71) Applicant: Capital One Services, LLC, McLean, VA (US)

(72) Inventor: Michael Langford, Plano, TX (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

(21) Appl. No.: 18/060,737

(22) Filed: Dec. 1, 2022

(51) Int. Cl.
*G06N 20/00* (2019.01)
*G06F 16/23* (2019.01)

(52) U.S. Cl.
CPC ......... *G06F 16/2365* (2019.01); *G06N 20/00* (2019.01)

(58) Field of Classification Search
CPC .... G06F 18/23; G06F 18/2135; G06F 16/285; G06F 18/24; G06F 18/21; G06F 30/27; G06F 2218/12; G06F 18/213; G06F 16/24578; G06F 2218/08; G06F 16/2365; G06N 20/00; G06N 3/08; G06N 5/022
See application file for complete search history.

(56) References Cited

U.S. PATENT DOCUMENTS

2023/0040578 A1* 2/2023 Porter .................. G06F 18/00
2023/0045139 A1* 2/2023 Cheng ................. G06F 16/2433

OTHER PUBLICATIONS

Phishing Email Detection Based on Binary Search Feature Selection—Gunikhan Sonowal—Accepted: May 14, 2020 / Published online: Jun. 6, 2020 © Springer Nature Singapore Pte Ltd 2020 (Year: 2020).*

* cited by examiner

*Primary Examiner* — Hau H Hoang
(74) *Attorney, Agent, or Firm* — TROUTMAN PEPPER HAMILTON SANDERS LLP; Christopher J. Forstner; John A. Morrissett (57) ABSTRACT

Disclosed embodiments may include a system for providing a nearest neighbors classification pipeline with automated dimensionality reduction. The system may receive a dataset. The system may determine whether the dataset has a first dimensionality that exceeds a predetermined threshold. When dataset has a dimensionality that exceeds a predetermined threshold, the system may prompt a user to input an explained variance threshold ratio. The system may receive the explained variance threshold ratio. The system may iteratively perform a binary search on the dataset to determine a reduced dimensionality having a total explained variance ratio closest to but not less than the explained variance threshold ratio. The system may reduce the dataset to the reduced dimensionality to generate a reduced dataset. The system may train a machine learning model using the reduced dataset.

20 Claims, 3 Drawing Sheets

SYSTEMS AND METHODS FOR PROVIDING A NEAREST NEIGHBORS CLASSIFICATION PIPELINE WITH AUTOMATED DIMENSIONALITY REDUCTION

The disclosed technology relates to systems and methods for providing a nearest neighbors classification pipeline with automated dimensionality reduction. Specifically, this disclosed technology relates to automatically reducing the computational load of a nearest neighbors classification based on a specified explained variance threshold ratio.

BACKGROUND

Nearest neighbors algorithms, such as the K-nearest neighbors classification algorithm, classify new observations by finding K-many closest training observations to the new observation and use the majority class vote from this subset of training observations as the class for the new observation. These types of algorithms are commonly used in machine learning solutions. Since the nearest neighbors algorithms seek to find the closest neighbors for classification, distance metrics are used to determine the nearest neighbors. However, when the dimensionality of the training dataset is large, such as hundreds of input features, calculating distance metrics is not only computationally very expensive, but also gives rise to what is referred to as the "curse of dimensionality," which is a phenomenon in which the nearest neighbor classifications can result in lower accuracy classifications. Accordingly, to attempt to avoid or reduce these problems, it is often useful to reduce the dimensionality of high-dimensional datasets before applying certain distance-based machine learning algorithms to fit the data. However, it is very difficult for a data scientist to know how many dimensions to reduce the data by and still achieve meaningful classification results.

Accordingly, there is a need for improved systems and methods for providing a nearest neighbors classification pipeline with automated dimensionality reduction. Embodiments of the present disclosure are directed to this and other considerations.

SUMMARY

Disclosed embodiments may include a system for providing a nearest neighbors classification pipeline with automated dimensionality reduction. The system may include one or more processors, and memory in communication with the one or more processors and storing instructions that, when executed by the one or more processors, are configured to cause the system to provide a nearest neighbors classification pipeline with automated dimensionality reduction. The system may receive a dataset. The system may determine whether the dataset has a first dimensionality that exceeds a predetermined threshold. When dataset has a dimensionality that exceeds a predetermined threshold, the system may prompt a user to input an explained variance threshold ratio. The system may receive the explained variance threshold ratio. The system may iteratively perform a binary search on the dataset to determine a reduced dimensionality having a total explained variance ratio closest to but not less than the explained variance threshold ratio. The system may reduce the dataset to the reduced dimensionality to generate a reduced dataset. The system may train a machine learning model using the reduced dataset.

Disclosed embodiments may include a system for providing a nearest neighbors classification pipeline with automated dimensionality reduction. The system may include one or more processors, and memory in communication with the one or more processors and storing instructions that, when executed by the one or more processors, are configured to cause the system to provide a nearest neighbors classification pipeline with automated dimensionality reduction. The system may receive a dataset. The system may determine whether the dataset has a first dimensionality that exceeds a predetermined threshold. When dataset has a dimensionality that exceeds a predetermined threshold, the system may prompt a user to input an explained variance threshold ratio. The system may receive the explained variance threshold ratio. The system may iteratively perform a binary search on the dataset to determine a reduced dimensionality having a total explained variance ratio closest to but not less than the explained variance threshold ratio by: reducing the first dimensionality of the dataset to a second dimensionality that is half the first dimensionality and calculating a total explained variance ratio for the second dimensionality; determining whether the total explained variance ratio for the second dimensionality is (i) less than, (ii) greater than, or (iii) approximately equal to without being less than the explained variance threshold ratio; when the system determines the total explained variance ratio for the second dimensionality is less than the explained variance threshold ratio; expand the first dimensionality of the dataset to a third dimensionality that is halfway between the second dimensionality and the first dimensionality and calculate a total explained variance ratio for the third dimensionality; when the system determines the total explained variance ratio of the second dimensionality is greater than the explained variance threshold ratio; reduce the first dimensionality of the dataset to a fourth dimensionality that is halfway between the second dimensionality and a fifth dimensionality that is less than the second dimensionality and calculate a total explained variance ratio for the fourth dimensionality; and when the system determines that a calculated total explained variance ratio is approximately equal to the explained variance threshold ratio without being less than, stop performing the iterative binary search. The system may reduce the dataset to the reduced dimensionality to create a reduced dataset. The system may submit the reduced dataset to a K-nearest neighbor algorithm.

Disclosed embodiments may include a system for providing a nearest neighbors classification pipeline with automated dimensionality reduction. The system may include one or more processors, and memory in communication with the one or more processors and storing instructions that, when executed by the one or more processors, are configured to cause the system to provide a nearest neighbors classification pipeline with automated dimensionality reduction. The system may receive a dataset. The system may iteratively perform a binary search on the dataset to determine a reduced dimensionality having a total explained variance ratio closest to but not less than an explained variance threshold ratio. The system may reduce the dataset to the reduced dimensionality to generate a reduced dataset and reduced dimensionality parameters. The system may store the reduced dimensionality parameters. The system may train a machine learning model using the reduced dataset.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure related to systems and methods for providing a nearest neighbors classification pipeline with automated dimensionality reduction. More particularly, the disclosed technology relates to automatically reducing a training dataset in accordance with a desired explained variance ratio and training a K-nearest neighbors classification algorithm using the reduced training dataset for much faster classification of new data points. The systems and methods described herein utilize, in some instances, machine learning models, which are necessarily rooted in computers and technology. Machine learning models are a unique computer technology that involves training models to complete tasks and make decisions. K-nearest neighbors classification machine learning models involve calculating distance metrics between datapoints that can have hundreds or thousands or more dimensions/features, such models tend to consume a large amount of computing resources and take a very long time to execute, to the point where they may become impractical or untenable to use. The present disclosure details systems and methods for automatically reducing the number of features in the training dataset in accordance with a specified explained variance ratio that may be selected by a user and then automatically training the reduced training dataset to perform a classification of a new datapoint. Thus, in some examples, a user may input a desired explained variance ratio in association with the training dataset and the system will automatically reduce the number of features in the training dataset and train a K-nearest neighbors classification model using the reduced dataset in order to classify a new datapoint. This is a clear advantage and improvement over using the original training dataset to train the machine learning model in a conventional manner because it can greatly increase the speed with which the model is trained and reduce the amount of computing resources used to do so. This is also a clear advantage and improvement over methods of that may involve some aspect of a manual feature reduction (e.g., a user manually deletes or combines a column of data) because it can again greatly reduce the time needed to determine how many features to remove from the dataset (e.g., from days or weeks to minutes or hours) and by combining reduction of the dataset and training of the K-nearest neighbors classification model into one pipeline it allows a data scientist to generate a quickly trained model by simply inputting a single parameter (i.e., the desired explained variance ratio) along with the data. Thus, automating the reduction of features in a machine learning model allows the system to train and execute the model significantly faster and using less resources than would otherwise be possible, which is a clear improvement in the speed and output of the computing device in generating the machine learning model. Overall, the systems and methods disclosed have significant practical applications in the machine learning field because of the noteworthy improvements of the disclosed systems and methods, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
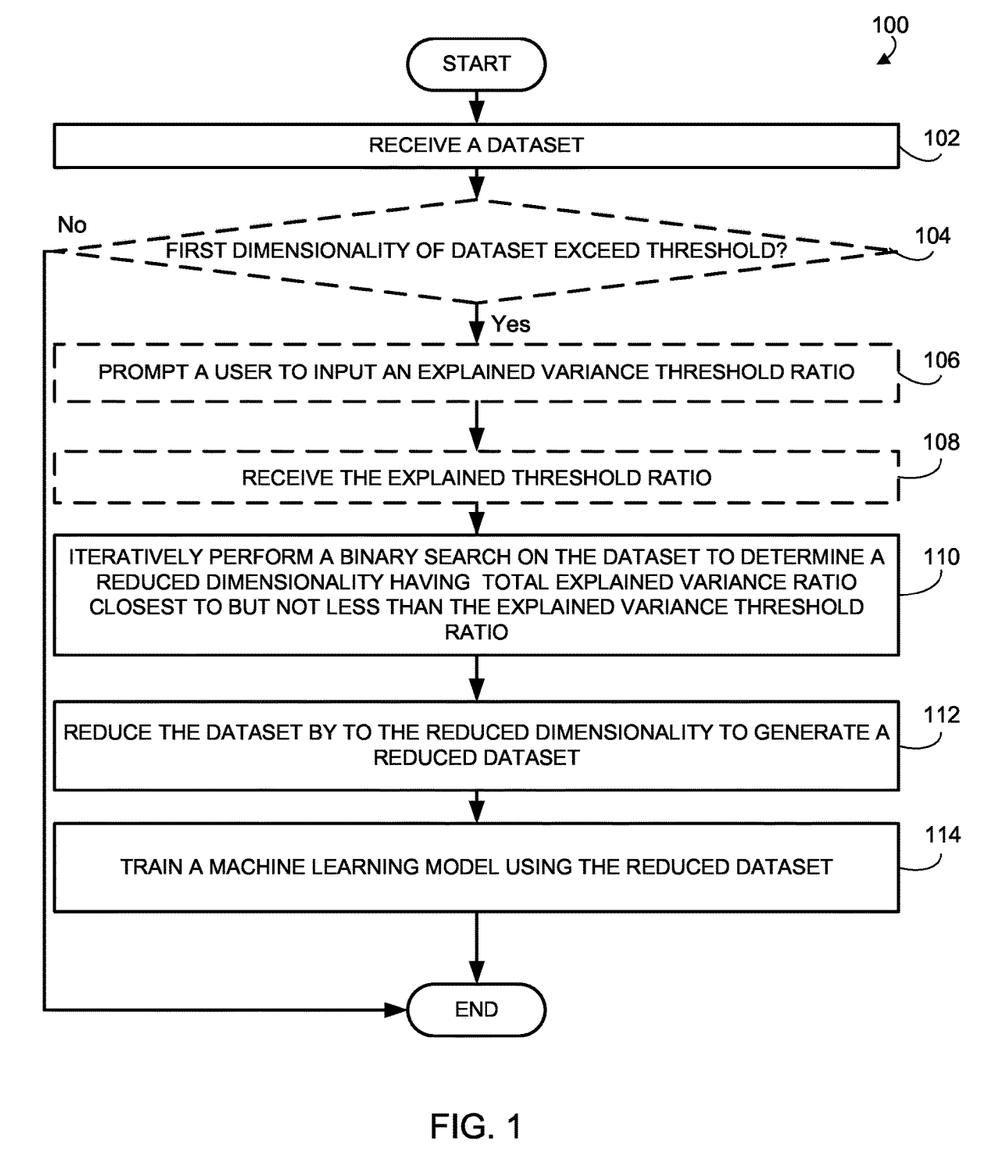
FIG. 1 is a flow diagram illustrating an exemplary method for providing a nearest neighbors classification pipeline with automated dimensionality reduction in accordance with certain embodiments of the disclosed technology.

FIG. 1 is a flow diagram illustrating an exemplary method 100 for providing a nearest neighbors classification pipeline with automated dimensionality reduction, in accordance with certain embodiments of the disclosed technology. The steps of method 100 may be performed by one or more components of the system 300 (e.g., reduction system 220 or web server 310 of preprocessing system 308 or user device 302), as described in more detail with respect to FIGS. 2 and 3.

In block 102, the reduction system 220 may receive a dataset. The dataset may be a training dataset of a plurality of datapoints, where each of the datapoints has a set of associated features. For example, a training dataset may be a set of house data and the associated features may be aspects such as square footage, number of bedrooms, number of bathrooms, sales price, zip code, and so on.

In block 104, the reduction system 220 may optionally determine whether the dataset has a first dimensionality that exceeds a predetermined threshold. For example, the predetermined threshold may be 5 dimensions, 10 dimensions, 20 dimensions, 50 dimensions, 100 dimensions or any other number as specified by the system or a user of the system. The number of dimensions corresponds to the number of features in the dataset. If the dataset does not have a first dimensionality that exceeds the predetermined threshold, then the method 100 may end, otherwise the method 100 may proceed to block 106. In other words, according to some embodiments, the reduction system 220 may first automatically determine whether the dataset received is of sufficient size and/or complexity to warrant application of the automated feature reduction techniques described herein before proceeding with such feature reduction techniques.

In block 106, the reduction system 220 may optionally prompt a user to input an explained variance threshold ratio. According to some embodiments, the explained variance threshold ratio may be a number between 0 and 1 or a percentage between 0% and 100%. According to some embodiments, instead of being input by a user, the explained variance threshold ratio may be set to a default value (e.g., "90%"). In some embodiments, the system may present the user with a plurality of options to select from (e.g., "50%, 55%, 60%, 65%, 70%, 75%, 80%, 85%, or 90%").

Figure 3:
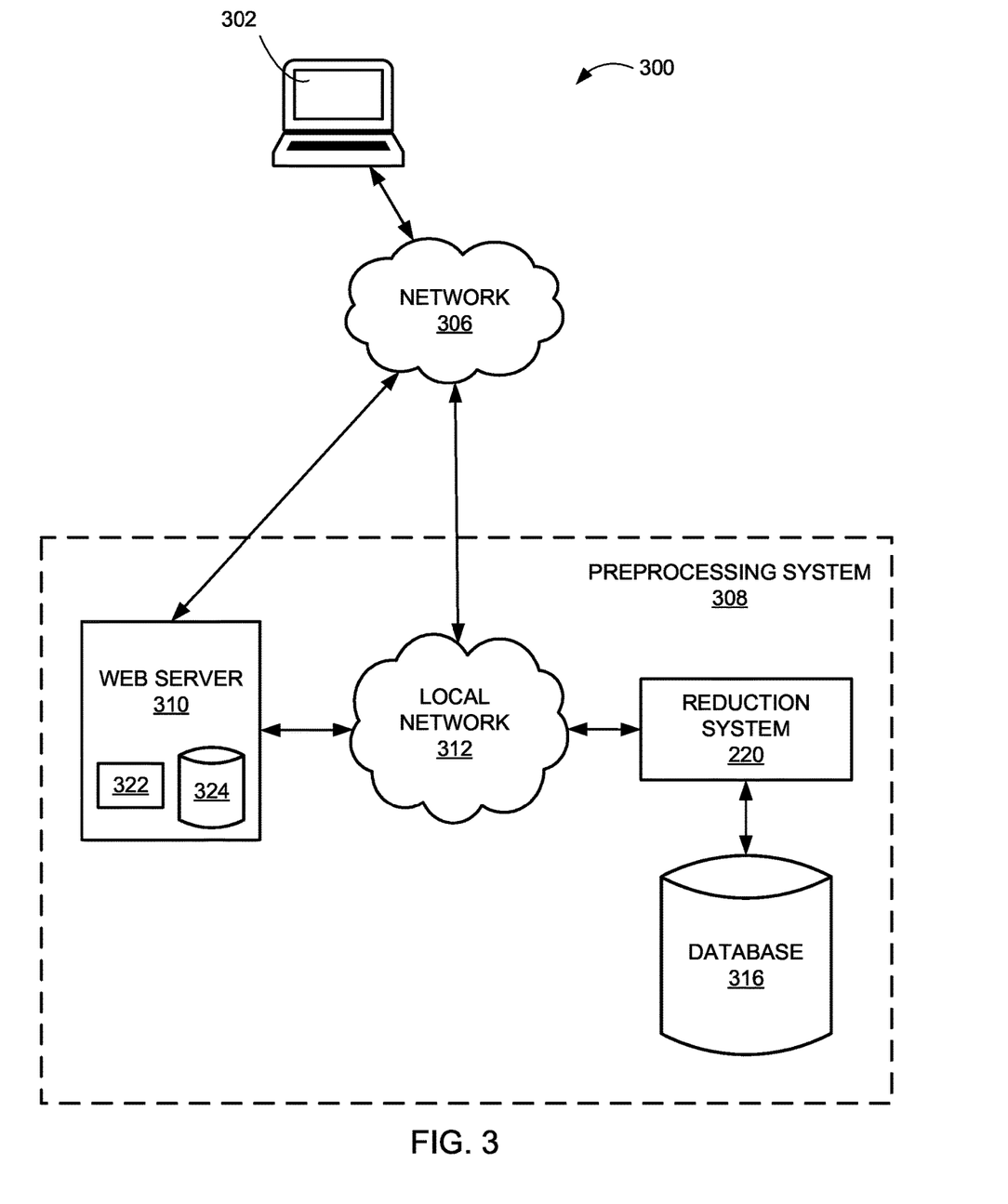
FIG. 3 is block diagram of an example system that may be used to provide providing a nearest neighbors classification pipeline with automated dimensionality reduction, according to an example implementation of the disclosed technology.

In block 108, the reduction system 220 may optionally receive the explained variance threshold ratio. For example, in some embodiments, the explained variance threshold may be input by a user of a user device 302 and may be transmitted to preprocessing system 308 via network 306. The reduction system 220 may store the explained variance threshold in memory (e.g., memory 230).

In block 110, the reduction system 220 may iteratively perform a binary search on the dataset to determine a reduced dimensionality having a total explained variance ratio closest to but not less than the explained variance threshold ratio. Generally speaking, a binary search involves splitting a remaining search area in half and determine whether the targeted value is above or below the current split level, before then designating a modified search area and performing a next split in half of the new search area. In other words, in each iteration, the current search area may be either increased or decreased by an amount that is half of the previous change in search area, where the process begins by reducing the original search area by half. In accordance with embodiments of the present disclosure, the search area of the binary search may be the number of features that are associated with a dataset and the iterative process will stop when it has determined a number of features to reduce the dataset to that corresponds to a total explained variance ratio that is at or just above the specified threshold ratio. In some embodiments, the reduction system 220 may specify a new dimensionality of the dataset to test against the specified explained variance ratio threshold by defining a new subset of the original features of the dataset (i.e., a new search area for the binary search) and calculating an explained variance ratio of the subset of features to compare to the specified explained variance ratio threshold. According to some embodiments, an explained variance ratio of a subset of features can be determined by determining an explained variance for each feature of the subset, summing them together, and dividing them by the total explained variance of the original full set of features. As will be understood by those of skill in the art, the explained variance of a particular feature can be calculated by the reduction system 220 using known methods such as by incorporating open source software that is designed to perform this function.

For example, as will be understood by those of skill in the art, in some embodiments, an explained variance ratio can be determined using Principal Component Analysis (PCA), which involves first determining the direction in the feature space that contains the most variance, then finding the next orthogonal (i.e., perpendicular) direction that contains the second-most variance, and so on until all dimensions are accounted for. Each of these new dimensions (called principal components) has a variance associated with it. The explained variance ratio may be the ratio of each one of the principal component variances to the total summed principal component variance. In PCA, the variances of the principal components are returned in descending order, such that a cumulative sum can be maintained from the first principal component to the last, which can be used for comparisons to a threshold value. As will be appreciated by those of skill in the art, PCA can be applied using an open source library (e.g., scikit-learn in Python). The original dataset and a desired number of reduced features can be input and PCA may find all of the principal components, sort them by the variance they capture, and then allow a user to perform queries for the explained variance ratio value. This value is calculated as the cumulative sum of all the variances of the new principal components up to the number that the user selected to be included. All of the remaining components with less variance are removed, leaving a cumulative variance ratio sum of less than 1. In this way, implementations of PCA may allow users to perform these actions and return an explained variance ratio value that describes how much of the variance was lost when some of the less useful principal components were eliminated.

Thus, according to some embodiments, the iterative performance of a binary search of block 110 can be performed by: reducing the first dimensionality of the dataset to a second dimensionality that is half the first dimensionality and calculating a total explained variance ratio for the second dimensionality; determining whether the total explained variance ratio for the second dimensionality is (i) less than, (ii) greater than, or (iii) approximately equal to without being less than the explained variance threshold ratio; when the system determines the total explained variance ratio for the second dimensionality is less than the explained variance threshold ratio; expand the first dimensionality of the dataset to a third dimensionality that is halfway between the second dimensionality and the first dimensionality and calculate a total explained variance ratio for the third dimensionality; when the system determines the total explained variance ratio of the second dimensionality is greater than the explained variance threshold ratio; reduce the first dimensionality of the dataset to a fourth dimensionality that is halfway between the second dimensionality and a fifth dimensionality that is less than the second dimensionality and calculate a total explained variance ratio for the fourth dimensionality; and when the system determines that a calculated total explained variance ratio is approximately equal to the explained variance threshold ratio without being less than, stop performing the iterative binary search.

To provide an example, if the received explained variance ratio threshold is "85%" and the training dataset has 100 features (i.e., a first dimensionality of 100), the reduction system 220 will determine a second dimensionality of a particular 50 features by cutting the number of features of the first dimensionality in half. According to some embodiments, the reduction system 220 selects the particular features that will be included in the new dimensionality by selecting half of the number of the original 100 features based on a sequential listing of the features. According to some embodiments, the features may be sorted or ordered sequentially based on their associated explained variance (e.g., as a result of applying the PCA method described above). The reduction system 220 may determine which features to remove from or add to determined dimensionalities based on this ordering, such that when the reduction system 220 removes features from a dimensionality, it removes features with the least amount of explained variance and when the reduction system 220 adds features to a dimensionality, it adds available features with the highest amount of explained variance. Once the second dimensionality is determined, the reduction system 220 then calculates an explained variance ratio for the second dimensionality (i.e., the selected 50 features) and determines whether it is higher or lower than 85%, and then determines a third dimensionality based on whether it is higher or lower. For example, if the calculated explained variance ratio of the second dimensionality (i.e., the selected 50 features) is "90%" then the reduction system 220 will determine that we have explained variance in excess of what is required and we can therefore afford to further reduce the dataset, in which case it will cut the second dimensionality in half to create a third dimensionality that is now made up of 25 of the previous 50 features. On the other hand, if the calculated explained variance ratio of the second dimensionality (i.e., the selected 50 features) is for example, 50%, then the reduction system 220 will determine that the second dimensionality has too little explained variance and the reduction system 220 will increase the explained variance by creating a third dimensionality that has 50% more dimensions. In other words, in this case the third dimensionality will have 75 features (i.e., the 50 features of the second dimensionality plus 25 features of the original dataset that were previously eliminated when creating the second dimensionality). In this way, the reduction system 220 can iteratively either reduce or expand the size of successive dimensionalities by 50% as many times as necessary until the calculated explained variance ratio of the new dimensionality is equal to or just above the explained variance ratio that was specified by the user. Once that point is reached, the reduction system 220 can identify the associated dimensionality to be the dimensionality of the reduced dataset and generate the reduced dataset by eliminating a corresponding number of dimensions. For example, if in the above example the final dimensionality is determined to be 72 features, then the reduction system 220 will reduce the number of features of the original dataset of 100 features by 28 features, so that the reduced dataset has 72 features.

Although a binary search model is a relatively efficient way to search when a lot of data is involved (i.e., a large number of features), it is contemplated that search methods other than a binary search may be utilized in other embodiments. For example, in some embodiments, the reduction system 220 may perform a sequential search. In other words, if the number of features is 100, the reduction system 220 may first calculate the explained variance ratio of 99 features, then 98 features, then 97 features, and so on until it calculates an explained variance ratio that is less than the desired threshold explained variance ratio, in which case it will select the prior calculated dimensionality as the reduced dimensionality. According to some embodiments, a search algorithm may be selected based on the number of dimensions of the dataset.

As the number of dimensions should be a whole number, the reduction system 220 may be configured to use a function such as a floor or ceiling function to create a whole number, or otherwise be configured to round dimensionality numbers up or down. For example, in the example above, if it is necessary to generate a fourth dimensionality based on the third dimensionality of 75 dimensions, depending on whether dimensions should be added or removed, the number of dimensions of the fourth dimensionality will be calculated to be 75+/−25/2, or either 62.5 or 87.5, which are not whole numbers. Thus, in various embodiments, the reduction system 220 can be configured to round calculated dimensionalities up (i.e., 63 and 88), down (i.e., 62 and 87), round the calculated dimensionalities to outside numbers by rounding down for decreases in dimensionality and up for increases in dimensionality (i.e., 62 and 88) or round the calculated dimensionalities to inside numbers by rounding up for decreases in dimensionality and down for increases in dimensionality (i.e., 63 and 87).

According to some embodiments, the reduction system 220 may determine that the calculated explained variance ratio is just above the explained variance ratio specified by the user when the specified explained variance ratio is within a predetermined proximity threshold of the calculated explained variance ratio. For example, if the proximity threshold is set to "0.2%" and the specified explained variance ratio is "85%," then if the calculated explained variance ratio of a given dimensionality is, for example, "85.14%" then the reduction system 220 will stop the iterative process of calculating new dimensionalities, whereas if the calculated explained variance ratio of a given dimensionality is, for example, "85.38%" then the reduction system 220 would continue on with the iterative process to calculate a new dimensionality.

In some embodiments, determining that the calculated explained variance ratio is just above the explained variance ratio specified by the user may involve arriving at a dimensionality that is no longer dividable into a new dimensionality. For example, in the example described above, if the system is set to round up and the fourth dimensionality is 88, the fifth dimensionality may be halfway between 75 and 88 (i.e., 81), the sixth dimensionality may be halfway between 81 and 88 (i.e., 85), and the seventh dimensionality may be halfway between 85 and 88 (i.e., 87). At this point the dimensionality may not be divided any further because may not be any other whole numbers left between the bounds that may be used to create a next dimensionality (i.e., [87, 88]) that have not already been used as a tested dimensionality, and therefore the reduction system 220 may stop iterating at this point and determine that 87 is the dimensionality that has a explained variance ratio that is just above the user specified explained variance ratio.

In block 112, the reduction system 220 may reduce the dataset to the reduced dimensionality to create a reduced dataset. Thus, for example, if the original dataset has 100 features and in accordance with the steps described herein the reduction system 220 determines a reduced dimensionality of 83, then the reduction system 220 may generate a reduced version of the original dataset that only has 83 features, by way of eliminating and/or combining 17 of the original features as explained herein. The reduced dataset can then be trained and/or classified at a much faster speed and utilizing much fewer computing resources.

Figure 2:
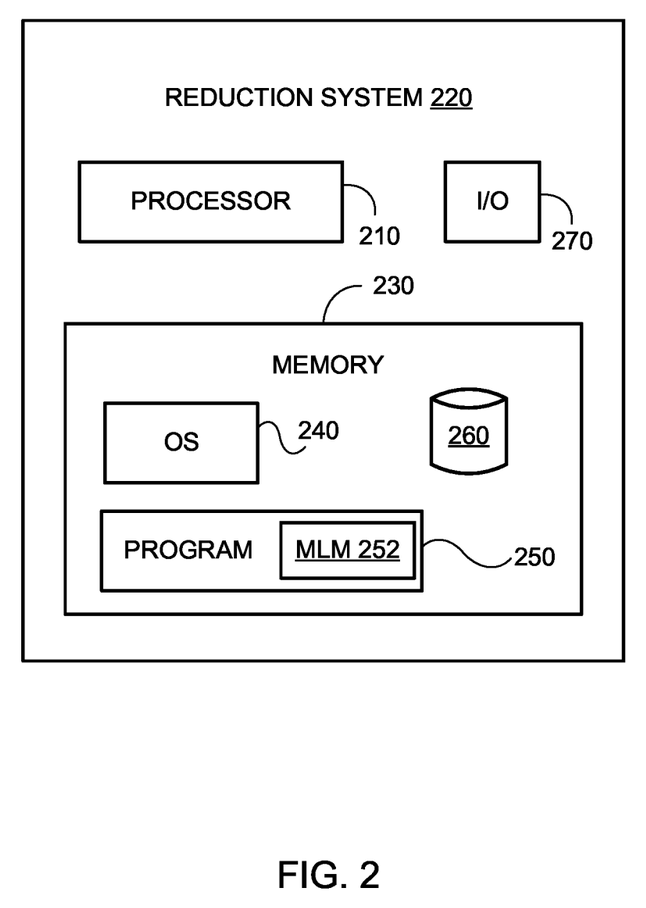
FIG. 2 is block diagram of an example reduction system used to provide providing a nearest neighbors classification pipeline with automated dimensionality reduction, according to an example implementation of the disclosed technology.

According to some embodiments, the reduction system 220 may reduce the to the reduced dimensionality to generate a reduced dataset and reduced dimensionality parameters. The reduction system 220 may store the reduced dimensionality parameters, using for example, database 260. The reduced dimensionality parameters may include for example, the identification of features to be eliminated and features to be retained, the calculated explained variance of each feature of the reduced dataset (which may also include the explained variance of features to be eliminated from the reduced dataset), and indications and data related to methodologies used to eliminate features (e.g., whether columns are simply erased or whether they are combined, and if combined, which columns are combined and using what weights, etc.). In some embodiments, the reduced dimensionality parameters may also include information about one or more tested dimensionalities of dataset that were tested during the iterative process, such as the number of dimensions and the associated calculated explained variance ratio. According to some embodiments, the reduction system 220 may allow a user to view the dimensionality parameters and input manual modifications to the reduced dataset, such as for example, manually changing the dimensionality to a new dimensionality based on viewing calculated explained variance ratios associated with different dimensionalities tested by the system. For example, although the reduction system 220 may identify the dimensionality of the dataset that most closely corresponds to a desired explained variance ratio of the user, if the user later changes their mind and desires a different explained variance ratio, the user may be able to simply view the results of prior tested dimensionalities (and their associated calculated explained variance ratios) and select a dimensionality that most closely corresponds to the newly desired explained variance ratio.

Creating a reduced dataset by reducing the number of features can involve deleting features and/or combining features together. Accordingly, in some embodiments, reducing the dataset may further include combining at least one feature set of the dataset from one or more first columns with a second feature set of the dataset in a first second column and eliminating the one or more first columns originally. For example, if the dataset relates to housing data, a first feature may be a number of bedrooms and a second feature may be a number of bathrooms, and it may be possible to reduce these by one feature by either, for example, deleting the column (e.g., in spreadsheet of data) that lists the number of bathrooms or alternatively by combining the two columns by, for example, simply adding the number of bedrooms to the number of bathrooms. In some embodiments, reducing the dataset may further include determining weights for the at least one feature set and the second feature set and applying the weights when combining the at least one feature set and the second feature set. Thus, in the previous example, the system may multiply the number of bedrooms by, for example, 0.7 and the number bathrooms by 0.3 and add them together in one column, to create a new feature that replaces two old features and yet still retains some information from the deleted features. In some embodiments, the weights may be one or more first weights and a second weight. According to some embodiments, the reduction system 220 may automatically determine the weights based on the explained variance of each feature. For example, as will be appreciated of those of skill in the art, using PCA may automatically determine these weights. In general, features with a greater explained variance will have more predictive power in performing classifications and thus may be given greater weights than features with less explained variance. In some embodiments, at least one of the one or more first weights and the second weight may be different.

In block 114, the reduction system 220 may train a machine learning model using the reduced dataset. As will be appreciated by those of skill in the art, the trained machine model can then be used to make predictions about new datapoints but inputting new datapoints into the trained model. For example, a machine learning model that is trained to make predictions about the price of a house based on the features of other houses may make a prediction about what the value of a new house on the market should be, in response to the features of the new house being input into the trained machine learning model.

According to some embodiments, the machine learning model may include and/or the reduced dataset may be submitted to, a K-nearest neighbors algorithm. For example, the reduction system 220 may utilize the reduced dataset to train a K-nearest neighbor algorithm that is designed to classify new datapoints. As will be understood by those of skill in the art, a nearest neighbors algorithm, such as a K-nearest neighbors algorithm, can be used to make predictions about or classifications of new datapoints based on how closely the features of the new datapoint are to the features of one or more datapoints of the training dataset, essentially trying to find the training datapoints that are most similar to the new datapoint in terms of their features.

Thus, in accordance with embodiments described herein, a user may use the reduction system 220 to quickly and automatically reduce the feature space of a high-dimension training set based on a desired level minimal explained variance ratio threshold and train a machine learning model to make predictions about new data points. In other words, in accordance with some embodiments, a user may merely select or input a training data set and a desired explained variance ratio threshold to the reduction system 220, and the reduction system 220 may automatically generate a trained machine learning model that is configured to make predictions about desired datapoints.

As will be appreciated, the techniques described herein can be applied to a myriad of different datasets to quickly generate trained machine learning models to make predictions about various things. For example, the techniques described herein could be used to train a machine learning model to predict whether a given transaction is fraudulent or not by using a training dataset that has features such as, for example, day of the week, the time of the transaction, the country or zip code of the transaction, the amount the transaction was for, the number of previous transactions between these two accounts, and other such features. A training dataset may be labeled by, for example, denoting transactions that are fraudulent with a "1" and transactions that are not fraudulent with a "0." The reduction system 220 can be used to train a machine learning model/pipeline on these features to predict future cases of fraud in near-real time.

FIG. 2 is a block diagram of an example reduction system 220 used to automatically reduce a number of features/dimensions of a training dataset based on a specified explained variance ratio and automatically train a K-nearest neighbors classification algorithm based on the reduced training dataset according to an example implementation of the disclosed technology. According to some embodiments, the user device 302 and web server 310, as depicted in FIG. 3 and described below, may have a similar structure and components that are similar to those described with respect to reduction system 220 shown in FIG. 2. As shown, the reduction system 220 may include a processor 210, an input/output (I/O) device 270, a memory 230 containing an operating system (OS) 240 and a program 250. In certain example implementations, the reduction system 220 may be a single server or may be configured as a distributed computer system including multiple servers or computers that interoperate to perform one or more of the processes and functionalities associated with the disclosed embodiments. In some embodiments reduction system 220 may be one or more servers from a serverless or scaling server system. In some embodiments, the reduction system 220 may further include a peripheral interface, a transceiver, a mobile network interface in communication with the processor 210, a bus configured to facilitate communication between the various components of the reduction system 220, and a power source configured to power one or more components of the reduction system 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 210 may be a single core processor that is configured with virtual processing technologies. In certain embodiments, the processor 210 may use logical processors to simultaneously execute and control multiple processes. The processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the reduction system 220 may include one or more storage devices configured to store information used by the processor 210 (or other components) to perform certain functions related to the disclosed embodiments. In one example, the reduction system 220 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The reduction system 220 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the reduction system 220 may include the memory 230 that may include one or more programs 250 to perform one or more functions of the disclosed embodiments. For example, in some embodiments, the reduction system 220 may additionally manage dialogue and/or other interactions with the customer via a program 250.

The processor 210 may execute one or more programs 250 located remotely from the reduction system 220. For example, the reduction system 220 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a reduction system database 260 for storing related data to enable the reduction system 220 to perform one or more of the processes and functionalities associated with the disclosed embodiments.

The reduction system database 260 may include stored data relating to status data (e.g., average session duration data, location data, idle time between sessions, and/or average idle time between sessions) and historical status data. The reduction database 260 may include stored data including data and datasets, such as a training dataset and a reduced training dataset. According to some embodiments, the functions provided by the reduction system database 260 may also be provided by a database that is external to the reduction system 220, such as the database 316 as shown in FIG. 3.

The reduction system 220 may also be communicatively connected to one or more memory devices (e.g., databases) locally or through a network. The remote memory devices may be configured to store information and may be accessed and/or managed by the reduction system 220. By way of example, the remote memory devices may be document management systems, Microsoft™ SQL database, Share- Point™ databases, Oracle™ databases, Sybase™ databases, or other relational or non-relational databases. Systems and methods consistent with disclosed embodiments, however, are not limited to separate databases or even to the use of a database.

The reduction system 220 may also include one or more I/O devices 270 that may comprise one or more interfaces for receiving signals or input from devices and providing signals or output to one or more devices that allow data to be received and/or transmitted by the reduction system 220. For example, the reduction system 220 may include interface components, which may provide interfaces to one or more input devices, such as one or more keyboards, mouse devices, touch screens, track pads, trackballs, scroll wheels, digital cameras, microphones, sensors, and the like, that enable the reduction system 220 to receive data from a user (such as, for example, via the user device 302).

In examples of the disclosed technology, the reduction system 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The reduction system 220 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LS™) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The reduction system 220 may be configured to adjust model parameters during training. Model parameters may include weights, coefficients, offsets, or the like. Training may be supervised or unsupervised.

The reduction system 220 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The reduction system 220 may be configured to optimize statistical models using known optimization techniques.

Furthermore, the reduction system 220 may include programs configured to retrieve, store, and/or analyze properties of data models and datasets. For example, reduction system 220 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The reduction system 220 may include algorithms to determine a data type, key-value pairs, row-column data structure, statistical distributions of information such as keys or values, or other property of a data schema may be configured to return a statistical profile of a dataset (e.g., using a data-profiling model). The reduction system 220 may be configured to implement univariate and multivariate statistical methods. The reduction system 220 may include a regression model, a Bayesian model, a statistical model, a linear discriminant analysis model, or other classification model configured to determine one or more descriptive metrics of a dataset. For example, reduction system 220 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The reduction system 220 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, reduction system 220 may be configured to generate a similarity metric representing a measure of similarity between data in a dataset. A similarity metric may be based on a correlation, covariance matrix, a variance, a frequency of overlapping values, or other measure of statistical similarity.

The reduction system 220 may be configured to generate a similarity metric based on data model output, including data model output representing a property of the data model. For example, reduction system 220 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The reduction system 220 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The reduction system 220 may include one or more data classification models to classify datasets based on the data schema, statistical profile, and/or edges. A data classification model may include a convolutional neural network, a random forest model, a recurrent neural network model, a support vector machine model, a K-nearest neighbors model, or another machine learning model. A data classification model may be configured to classify data elements as actual data, synthetic data, related data, or any other data category. In some embodiments, reduction system 220 is configured to generate and/or train a classification model to classify a dataset, consistent with disclosed embodiments.

While the reduction system 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the reduction system 220 may include a greater or lesser number of components than those illustrated.

FIG. 3 is a block diagram of an example system that may be used to interact with preprocessing system 308, according to an example implementation of the disclosed technology. The components and arrangements shown in FIG. 3 are not intended to limit the disclosed embodiments as the components used to implement the disclosed processes and features may vary. As shown, preprocessing system 308 may interact with a user device 302 via a network 306. In certain example implementations, the preprocessing system 308 may include a local network 312, a reduction system 220, a web server 310, and a database 316.

In some embodiments, a user may operate the user device 302. The user device 302 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 306 and ultimately communicating with one or more components of the preprocessing system 308. In some embodiments, the user device 302 may include or incorporate electronic communication devices for hearing or vision impaired users.

Users may include individuals who are seeking to classify new datapoints using an efficiently trained K-nearest neighbors machine learning algorithm using the preprocessing system 308. According to some embodiments, the user device 302 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The reduction system 220 may include programs (scripts, functions, algorithms) to configure data for visualizations and provide visualizations of datasets and data models on the user device 302. This may include programs to generate graphs and display graphs. The reduction system 220 may include programs to generate histograms, scatter plots, time series, or the like on the user device 302. The reduction system 220 may also be configured to display properties of data models and data model training results including, for example, architecture, loss functions, cross entropy, activation function values, embedding layer structure and/or outputs, convolution results, node outputs, or the like on the user device 302.

The network 306 may be of any suitable type, including individual connections via the internet such as cellular or WiFi networks. In some embodiments, the network 306 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 306 may include any type of computer networking arrangement used to exchange data. For example, the network 306 may be the Internet, a private data network, virtual private network (VPN) using a public network, and/or other suitable connection(s) that enable(s) components in the system 300 environment to send and receive information between the components of the system 300. The network 306 may also include a PSTN and/or a wireless network.

The preprocessing system 308 may be associated with and optionally controlled by one or more entities such as a business, corporation, individual, partnership, or any other entity that provides one or more of goods, services, and consultations to individuals such as customers. In some embodiments, the preprocessing system 308 may be controlled by a third party on behalf of another business, corporation, individual, partnership. The preprocessing system 308 may include one or more servers and computer systems for performing one or more functions associated with products and/or services that the organization provides.

Web server 310 may include a computer system configured to generate and provide one or more websites accessible to customers, as well as any other individuals involved in access system 308's normal operations. Web server 310 may include a computer system configured to receive communications from user device 302 via for example, a mobile application, a chat program, an instant messaging program, a voice-to-text program, an SMS message, email, or any other type or format of written or electronic communication. Web server 310 may have one or more processors 322 and one or more web server databases 324, which may be any suitable repository of website data. Information stored in web server 310 may be accessed (e.g., retrieved, updated, and added to) via local network 312 and/or network 306 by one or more devices or systems of system 300. In some embodiments, web server 310 may host websites or applications that may be accessed by the user device 302. For example, web server 310 may host a financial service provider website that a user device may access by providing an attempted login that are authenticated by the reduction system 220. According to some embodiments, web server 310 may include software tools, similar to those described with respect to user device 302 above, that may allow web server 310 to obtain network identification data from user device 302. The web server may also be hosted by an online provider of website hosting, networking, cloud, or backup services, such as Microsoft Azure™ or Amazon Web Services™.

According to some embodiments, the web server 310 may interact with the user device 302 to facilitate remote use of the reduction system 220. For example, in some embodiments, the user device 302 may include a software application that may interface with reduction system 220 via web server 310 to allow a user to input a desired explained variance ratio in association with a specified training dataset, which may be stored locally in database 316. In this way, the system 300 can enable a user to remotely utilize the reduction system 220 to automatically reduce a training dataset and train a K-nearest neighbors classification model on the reduced dataset by merely inputting a selection of a training dataset and a specified desired explained variance ratio (e.g., 90%). The user may input or specify a new data point and the trained classification model may classify the new data point. In this way, a remote user of user device 302 can be enabled to quickly generate a model and use it to classify a data point with minimal data transfer.

The local network 312 may include any type of computer networking arrangement used to exchange data in a localized area, such as WiFi, Bluetooth™, Ethernet, and other suitable network connections that enable components of the preprocessing system 308 to interact with one another and to connect to the network 306 for interacting with components in the system 300 environment. In some embodiments, the local network 312 may include an interface for communicating with or linking to the network 306. In other embodiments, certain components of the preprocessing system 308 may communicate via the network 306, without a separate local network 306.

The preprocessing system 308 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 302 may be able to access preprocessing system 308 using the cloud computing environment. User device 302 may be able to access preprocessing system 308 using specialized software. The cloud computing environment may eliminate the need to install specialized software on user device 302.

In accordance with certain example implementations of the disclosed technology, the preprocessing system 308 may include one or more computer systems configured to compile data from a plurality of sources the reduction system 220, web server 310, and/or the database 316. The reduction system 220 may correlate compiled data, analyze the compiled data, arrange the compiled data, generate derived data based on the compiled data, and store the compiled and derived data in a database such as the database 316. According to some embodiments, the database 316 may be a database associated with an organization and/or a related entity that stores a variety of information relating to customers, transactions, ATM, and business operations. The database 316 may also serve as a back-up storage device and may contain data and information that is also stored on, for example, database 260, as discussed with reference to FIG. 2.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Although the preceding description describes various functions of a web server 310, a reduction system 220, a database 316, and user device 302 in some embodiments, some or all of these functions may be carried out by a single computing device.

Example Use Case

The following example use case describes an example of a typical user flow pattern. This section is intended solely for explanatory purposes and not in limitation.

In one example, a user may want to utilize a nearest neighbors classification algorithm to make a prediction about a new data point. For example, the user may want to determine what a fair price of a house that is to be newly listed on the market should be in view of all of the other houses on the market. The user may have a training dataset that is made up of data on hundreds or thousands of houses in the area surrounding the newly listed house. The data may include a wide array of include features such as the square footage, the number of bedrooms, number of bathrooms, zip code, year of construction, style, whether there is a garage and how many cars it fits, the amount of HOA dues, the name of the community, associated school zones, county, city, and so on and so on. The training dataset may have a number of features that is so large that it would cause the classification algorithm to take an excessive amount of time to process and may result in less accurate results. Accordingly, the user may want to reduce the number of features in order to improve the performance of the classification algorithm but it may not be clear how many and which features to eliminate. However, the user can utilize the system (e.g., preprocessing system 308) automatically reduce the dimensionality of the dataset while maintaining a desired level variance by simply inputting a desired explained variance ratio along with the training dataset. For example, the user may input an explained variance ratio of "90%" in association with the training dataset. The system will automatically determine a number of features to reduce the dataset by to achieve the desired variance ratio of 90%, will reduce the dataset and train the K-nearest neighbor classification model to make a prediction about the new data point (e.g., it may output a prediction that the newly listed house should be listed for $710,000). Thus, the system automatically reduces the training dataset while maintaining a desired level of variance to allow the classification algorithm to execute much faster, utilizing less computing resources and with potentially more accurate classification results than it would otherwise.

In some examples, disclosed systems or methods may involve one or more of the following clauses:

Clause 1: A system, comprising: one or more processors; and a memory in communication with the one or more processors and storing instructions that, when executed by the one or more processors, are configured to cause the system to: receive a dataset; determine whether the dataset has a first dimensionality that exceeds a predetermined threshold; when dataset has a dimensionality that exceeds a predetermined threshold, prompt a user to input an explained variance threshold ratio; receive the explained variance threshold ratio; iteratively perform a binary search on the dataset to determine a reduced dimensionality having a total explained variance ratio closest to but not less than the explained variance threshold ratio; reduce the dataset to the reduced dimensionality to generate a reduced dataset; and train a machine learning model using the reduced dataset.

Clause 2: The system of clause 1, wherein the explained variance threshold ratio has a default value.

Clause 3: The system of clause 1, wherein the machine learning model comprises a K-nearest neighbor algorithm.

Clause 4: The system of clause 1, wherein reducing the dataset further comprises: combining at least one feature set of the dataset from one or more first columns with a second feature set of the dataset in a first second column; and eliminating the one or more first columns originally.

Clause 5: The system of clause 4, wherein reducing the dataset further comprises: determining weights for the at least one feature set and the second feature set; and applying the weights when combining the at least one feature set and the second feature set.

Clause 6: The system of clause 5, wherein the weights comprise one or more first weights and a second weight.

Clause 7: The system of clause 6, wherein at least one of the one or more first weights and the second weight are different.

Clause 8: The system of clause 1, wherein iteratively performing the binary search comprises: reducing the first dimensionality of the dataset to a second dimensionality that is half the first dimensionality and calculating a total explained variance ratio for the second dimensionality; determining whether the total explained variance ratio for the second dimensionality is (i) less than, (ii) greater than, or (iii) approximately equal to without being less than the explained variance threshold ratio; when the system determines the total explained variance ratio for the second dimensionality is less than the explained variance threshold ratio; expand the first dimensionality of the dataset to a third dimensionality that is halfway between the second dimensionality and the first dimensionality and calculate a total explained variance ratio for the third dimensionality; when the system determines the total explained variance ratio of the second dimensionality is greater than the explained variance threshold ratio; reduce the first dimensionality of the dataset to a fourth dimensionality that is halfway between the second dimensionality and a fifth dimensionality that is less than the second dimensionality and calculate a total explained variance ratio for the fourth dimensionality; and when the system determines that a calculated total explained variance ratio is approximately equal to the explained variance threshold ratio without being less than, stop performing the iterative binary search.

Clause 9: A system, comprising: one or more processors; and a memory in communication with the one or more processors and storing instructions that, when executed by the one or more processors, are configured to cause the system to: receive a dataset; determine whether the dataset has a first dimensionality that exceeds a predetermined threshold; when dataset has a dimensionality that exceeds a predetermined threshold, prompt a user to input an explained variance threshold ratio; receive the explained variance threshold ratio; iteratively perform a binary search on the dataset to determine a reduced dimensionality having a total explained variance ratio closest to but not less than the explained variance threshold ratio by: reducing the first dimensionality of the dataset to a second dimensionality that is half the first dimensionality and calculating a total explained variance ratio for the second dimensionality; determining whether the total explained variance ratio for the second dimensionality is (i) less than, (ii) greater than, or (iii) approximately equal to without being less than the explained variance threshold ratio; when the system determines the total explained variance ratio for the second dimensionality is less than the explained variance threshold ratio; expand the first dimensionality of the dataset to a third dimensionality that is halfway between the second dimensionality and the first dimensionality and calculate a total explained variance ratio for the third dimensionality; when the system determines the total explained variance ratio of the second dimensionality is greater than the explained variance threshold ratio; reduce the first dimensionality of the dataset to a fourth dimensionality that is halfway between the second dimensionality and a fifth dimensionality that is less than the second dimensionality and calculate a total explained variance ratio for the fourth dimensionality; and when the system determines that a calculated total explained variance ratio is approximately equal to the explained variance threshold ratio without being less than, stop performing the iterative binary search; reduce the dataset to the reduced dimensionality to create a reduced dataset; and submit the reduced dataset to a K-nearest neighbor algorithm.

Clause 10: The system of clause 9, wherein the explained variance threshold ratio has a default value.

Clause 11: The system of clause 10, wherein the default value comprises 90 percent.

Clause 12: The system of clause 9, wherein reducing the dataset further comprises: combining at least one feature set of the dataset from one or more first columns with a second feature set of the dataset in a first second column; and eliminating the one or more first columns originally.

Clause 13: The system of clause 12, wherein reducing the dataset further comprises: determining weights for the at least one feature set and the second feature set; and applying the weights when combining the at least one feature set and the second feature set.

Clause 14: The system of clause 13, wherein the weights comprise one or more first weights and a second weight.

Clause 15: The system of clause 14, wherein at least one of the one or more first weights and the second weight are different.

Clause 16: A system, comprising: one or more processors; and a memory in communication with the one or more processors and storing instructions that, when executed by the one or more processors, are configured to cause the system to: receive a dataset; iteratively perform a binary search on the dataset to determine a reduced dimensionality having a total explained variance ratio closest to but not less than an explained variance threshold ratio; and reduce the dataset to the reduced dimensionality to generate a reduced dataset and reduced dimensionality parameters; store the reduced dimensionality parameters; and train a machine learning model using the reduced dataset.

Clause 17: The system of clause 16, wherein reducing the dataset further comprises: combining at least one feature set of the dataset from one or more first columns with a second feature set of the dataset in a first second column; and eliminating the one or more first columns originally.

Clause 18: The system of clause 17, wherein reducing the dataset further comprises: determining weights for the at least one feature set and the second feature set; and applying the weights when combining the at least one feature set and the second feature set.

Clause 19: The system of clause 18, wherein the weights comprise one or more first weights and a second weight.

Clause 20: The system of clause 16, wherein iteratively performing the binary search comprises: reducing the first dimensionality of the dataset to a second dimensionality that is half the first dimensionality and calculating a total explained variance ratio for the second dimensionality; determining whether the total explained variance ratio for the second dimensionality is (i) less than, (ii) greater than, or (iii) approximately equal to without being less than the explained variance threshold ratio; when the system determines the total explained variance ratio for the second dimensionality is less than the explained variance threshold ratio; expand the first dimensionality of the dataset to a third dimensionality that is halfway between the second dimensionality and the first dimensionality and calculate a total explained variance ratio for the third dimensionality; when the system determines the total explained variance ratio of the second dimensionality is greater than the explained variance threshold ratio; reduce the first dimensionality of the dataset to a fourth dimensionality that is halfway between the second dimensionality and a fifth dimensionality that is less than the second dimensionality and calculate a total explained variance ratio for the fourth dimensionality; and when the system determines that a calculated total explained variance ratio is approximately equal to the explained variance threshold ratio without being less than, stop performing the iterative binary search.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
one or more processors; and
a memory in communication with the one or more processors and storing instructions that, when executed by the one or more processors, are configured to cause the system to:
receive a dataset;
determine whether the dataset has a first dimensionality that exceeds a predetermined threshold;
when dataset has a dimensionality that exceeds a predetermined threshold, prompt a user to input an explained variance threshold ratio;
receive the explained variance threshold ratio;
iteratively perform a binary search on the dataset to determine a reduced dimensionality having a total explained variance ratio closest to but not less than the explained variance threshold ratio;
reduce the dataset to the reduced dimensionality to generate a reduced dataset; and
train a machine learning model using the reduced dataset.

2. The system of claim 1, wherein the explained variance threshold ratio has a default value.

3. The system of claim 1, wherein the machine learning model comprises a K-nearest neighbor algorithm.

4. The system of claim 1, wherein reducing the dataset further comprises:
combining at least one feature set of the dataset from one or more first columns with a second feature set of the dataset in a first second column; and
eliminating the one or more first columns originally.

5. The system of claim 4, wherein reducing the dataset further comprises:
determining weights for the at least one feature set and the second feature set; and
applying the weights when combining the at least one feature set and the second feature set.

6. The system of claim 5, wherein the weights comprise one or more first weights and a second weight.

7. The system of claim 6, wherein at least one of the one or more first weights and the second weight are different.

8. The system of claim 1, wherein iteratively performing the binary search comprises:
reducing the first dimensionality of the dataset to a second dimensionality that is half the first dimensionality and calculating a total explained variance ratio for the second dimensionality;
determining whether the total explained variance ratio for the second dimensionality is (i) less than, (ii) greater than, or (iii) approximately equal to without being less than the explained variance threshold ratio;
when the system determines the total explained variance ratio for the second dimensionality is less than the explained variance threshold ratio; expand the dimensionality of the dataset to a third dimensionality that is halfway between the second dimensionality and the first dimensionality and calculate a total explained variance ratio for the third dimensionality;
when the system determines the total explained variance ratio of the second dimensionality is greater than the explained variance threshold ratio; reduce the dimensionality of the dataset to a fourth dimensionality that is halfway between the second dimensionality and a fifth dimensionality that is less than the second dimensionality and calculate a total explained variance ratio for the fourth dimensionality; and
when the system determines that a calculated total explained variance ratio is approximately equal to the explained variance threshold ratio without being less than, stop performing the iterative binary search.

9. A system, comprising:
one or more processors; and
a memory in communication with the one or more processors and storing instructions that, when executed by the one or more processors, are configured to cause the system to:
receive a dataset;
determine whether the dataset has a first dimensionality that exceeds a predetermined threshold;
when dataset has a dimensionality that exceeds a predetermined threshold, prompt a user to input an explained variance threshold ratio;
receive the explained variance threshold ratio;
iteratively perform a binary search on the dataset to determine a reduced dimensionality having a total explained variance ratio closest to but not less than the explained variance threshold ratio by:
reducing the first dimensionality of the dataset to a second dimensionality that is half the first dimensionality and calculating a total explained variance ratio for the second dimensionality;
determining whether the total explained variance ratio for the second dimensionality is (i) less than, (ii) greater than, or (iii) approximately equal to without being less than the explained variance threshold ratio;
when the system determines the total explained variance ratio for the second dimensionality is less than the explained variance threshold ratio; expand the dimensionality of the dataset to a third dimensionality that is halfway between the second dimensionality and the first dimensionality and calculate a total explained variance ratio for the third dimensionality;
when the system determines the total explained variance ratio of the second dimensionality is greater than the explained variance threshold ratio; reduce the dimensionality of the dataset to a fourth dimensionality that is halfway between the second dimensionality and a fifth dimensionality that is less than the second dimensionality and calculate a total explained variance ratio for the fourth dimensionality; and
when the system determines that a calculated total explained variance ratio is approximately equal to the explained variance threshold ratio without being less than, stop performing the iterative binary search;
reduce the dataset to the reduced dimensionality to create a reduced dataset; and
submit the reduced dataset to a K-nearest neighbor algorithm.

10. The system of claim 9, wherein the explained variance threshold ratio has a default value.

11. The system of claim 10, wherein the default value comprises 90 percent.

12. The system of claim 9, wherein reducing the dataset further comprises:
combining at least one feature set of the dataset from one or more first columns with a second feature set of the dataset in a first second column; and
eliminating the one or more first columns originally.

13. The system of claim 12, wherein reducing the dataset further comprises:

determining weights for the at least one feature set and the second feature set; and applying the weights when combining the at least one feature set and the second feature set.

14. The system of claim 13, wherein the weights comprise one or more first weights and a second weight.

15. The system of claim 14, wherein at least one of the one or more first weights and the second weight are different.

16. A system, comprising:

one or more processors; and a memory in communication with the one or more processors and storing instructions that, when executed by the one or more processors, are configured to cause the system to:

receive a dataset;

iteratively perform a binary search on the dataset to determine a reduced dimensionality having a total explained variance ratio closest to but not less than an explained variance threshold ratio; and reduce the dataset to the reduced dimensionality to generate a reduced dataset and reduced dimensionality parameters;

store the reduced dimensionality parameters; and train a machine learning model using the reduced dataset.

17. The system of claim 16, wherein reducing the dataset further comprises:

combining at least one feature set of the dataset from one or more first columns with a second feature set of the dataset in a first second column; and eliminating the one or more first columns originally.

18. The system of claim 17, wherein reducing the dataset further comprises:

determining weights for the at least one feature set and the second feature set; and applying the weights when combining the at least one feature set and the second feature set.

19. The system of claim 18, wherein the weights comprise one or more first weights and a second weight.

20. The system of claim 16, wherein iteratively performing the binary search comprises:

reducing the first dimensionality of the dataset to a second dimensionality that is half the first dimensionality and calculating a total explained variance ratio for the second dimensionality;

determining whether the total explained variance ratio for the second dimensionality is (i) less than, (ii) greater than, or (iii) approximately equal to without being less than the explained variance threshold ratio;

when the system determines the total explained variance ratio for the second dimensionality is less than the explained variance threshold ratio; expand the dimensionality of the dataset to a third dimensionality that is halfway between the second dimensionality and the first dimensionality and calculate a total explained variance ratio for the third dimensionality;

when the system determines the total explained variance ratio of the second dimensionality is greater than the explained variance threshold ratio; reduce the dimensionality of the dataset to a fourth dimensionality that is halfway between the second dimensionality and a fifth dimensionality that is less than the second dimensionality and calculate a total explained variance ratio for the fourth dimensionality; and when the system determines that a calculated total explained variance ratio is approximately equal to the explained variance threshold ratio without being less than, stop performing the iterative binary search.

* * * * *